United States Patent [19]

Gruber

[11] 4,195,403
[45] Apr. 1, 1980

[54] SAWDUST REMOVAL DEVICE

[76] Inventor: Clarence R. Gruber, 14 Falla Ct., Fort Myers, Fla. 33908

[21] Appl. No.: 37,523

[22] Filed: May 9, 1979

[51] Int. Cl.² .......................... B27B 19/09; B27C 3/08
[52] U.S. Cl. ...................................... 30/123.3; 30/392; 408/61
[58] Field of Search .................... 51/273, 356; 408/61, 408/56, 60; 30/123.3, 123.4, 392, 393

[56] References Cited

U.S. PATENT DOCUMENTS 3,033,252  5/1962  Atkinson ............................... 30/392

FOREIGN PATENT DOCUMENTS 498727  12/1953  Canada ..................................... 30/392
588454  of 0000  France ..................................... 408/61

Primary Examiner—Jimmy C. Peters
Attorney, Agent, or Firm—Benjamin P. Reese, II

[57] ABSTRACT

A sawdust removal device for attachment to the exterior housing of a saber saw or other electric-powered saw or drill. The device traps air discharged from an exhaust port in the saw or drill housing and diverts that air to continuously blow away sawdust, chips and other debris which accumulates on the surface of the material being cut or drilled during operation of the saw or drill.

9 Claims, 4 Drawing Figures

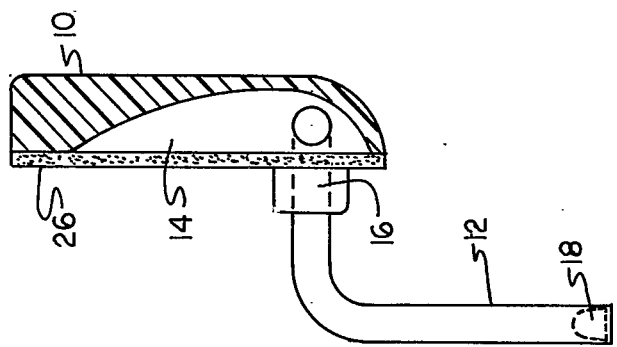
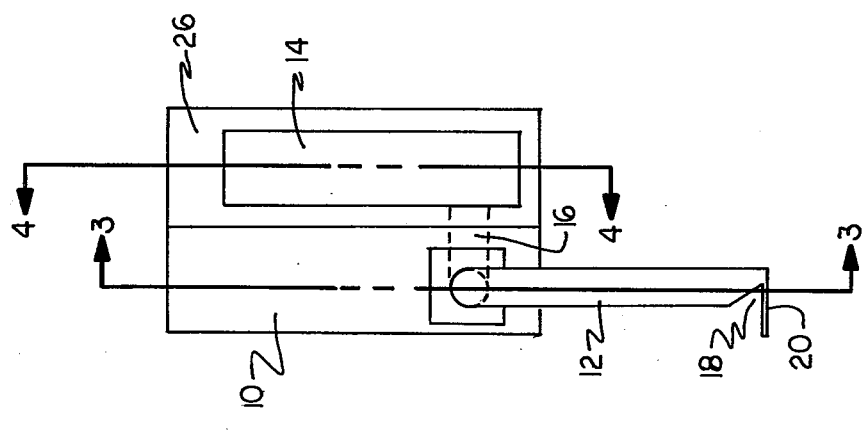
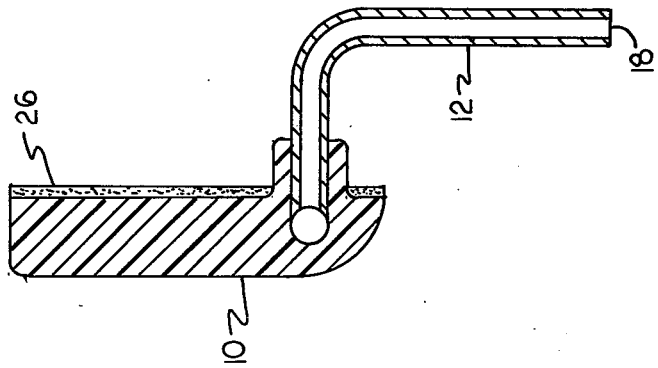

SAWDUST REMOVAL DEVICE

BACKGROUND AND SUMMARY OF THE INVENTION

This invention relates to a new and useful sawdust removal device for attachment to the exterior housing of a saber saw, i.e. a portable hand-held saw having a reciprocating blade and powered by an electric motor. With appropriate modifications, the device can be used with other electric-powered saws and electric-powered drills.

Saber saws are widely used by cabinet makers, carpenters and other persons engaged in the woodworking trades or metalworking trades, or both. In addition, saber saws are very popular with persons engaged in woodworking activities as a hobby. Most of these persons use a saber saw for similar purposes. Normally, a saber saw is used for precision cutting along a line drawn or scribed on the surface of the wood or other material being cut. Since a saber saw is hand held and guided, it is important for the person using the saw to have a clear and unobstructed view of the line which he or she is following during the cutting operation.

It is well known by both professional and amateur users of saber saws that sawdust, chips and other debris accumulate on the surface of the wood or other material being cut during normal operation of a saber saw. In general, such accumulations take place immediately in front of the saw blade. If such accumulations are not removed, the user of the saw will not be capable of seeing the line which he or she is attempting to follow. Under such circumstances, it is very probable that the user of the saw will make one or more cutting errors. Such errors are often very costly in terms of both lost time and materials.

Various means for removing sawdust, chips and other debris which accumulates on the surface of the wood or other material being cut are known in the art. For example the user of a saber saw can stop operation of the saw and tilt the wood or other material being cut to cause the sawdust, chips and other debris to fall from the surface of the wood or other material. Also, the user of a saber saw can brush the sawdust, chips and other debris from the surface of the wood or other material being cut with a cloth or a small brush. For safety reasons, it is preferable to stop operation of the saw when removing the sawdust, chips and other debris from the surface of the wood or other material being cut. And, of course, the user of a saber saw can either blow the sawdust, chips and other debris from the surface of the wood or other material being cut with compressed air or remove such accumulations with a shop vacuum cleaner. Unfortunately, many users of a saber saw do not have access to either a source of compressed air or a shop vacuum cleaner.

All of the above-described means for removing sawdust, chips and other debris from the surface of the wood or other material being cut with a saber saw have the disadvantage of requiring the user of the saw to interrupt his cutting operation to remove such accumulations. It is desirable to have a means for continuously removing such accumulations during operation of a saber saw. Continuous means for removing sawdust, chips and other debris from the surface of the wood or other material being cut during operation of a saber saw are described in U.S. Pat. Nos. 2,668,567, U.S. Pat. No. 2,902,067, and U.S. Pat. No. 3,033,252. Each of these patents discloses a means for diverting a portion of the discharged cooling air of the electric motor powering a saber saw through interior passageways in the saw housing to the immediate area of the reciprocating blade to blow away sawdust, chips and other debris. At times, a mild suction action occurs at the diverted air discharge opening of some known saber saws having such interior passageways causing the sawdust to be pulled into the face and eyes of the saw user. Even if this undesirable operating characteristic is not present with known means for continuously removing sawdust, chips and other debris, known means require substantial structural modifications to the design of conventional saber saws. It is desirable to have a device which can be attached to the exterior of the housing of a conventional saber saw. Ideally, no structural modifications to the design of the saw should be required for use of such a device.

The sawdust removal device of the present invention can be attached to the exterior of the housing of a conventional saber saw by traditional fastening means. No structural modifications to the design of the saw are required for use of this device. The sawdust removal device of the present invention traps air which is discharged from one of the two exhaust openings in the housing of a conventional saber saw and diverts the trapped air through an air delivery tube to a nozzle and diffuser located behind the reciprocating saw blade. This trapped and diverted air is discharged through the nozzle and diffuser and continuously blows sawdust, chips and other debris from the surface of the wood or other material being cut during use of the saber saw. The device can be attached to new saber saws during assembly operations at the manufacturing facility or attached to older saber saws by saw owners.

These and many other advantages and features of the present invention will be apparent from the following description of drawings, description of the preferred embodiment and the appended claims.

DESCRIPTION OF DRAWINGS

FIG. 2 is a side view of the sawdust removal device of the present invention.

FIG. 3 is a sectional view through lines 3—3 in FIG. 2.

FIG. 4 is a sectional view through lines 4—4 in FIG. 2.

DESCRIPTION OF THE PREFERRED EMBODIMENT

Figure 1:
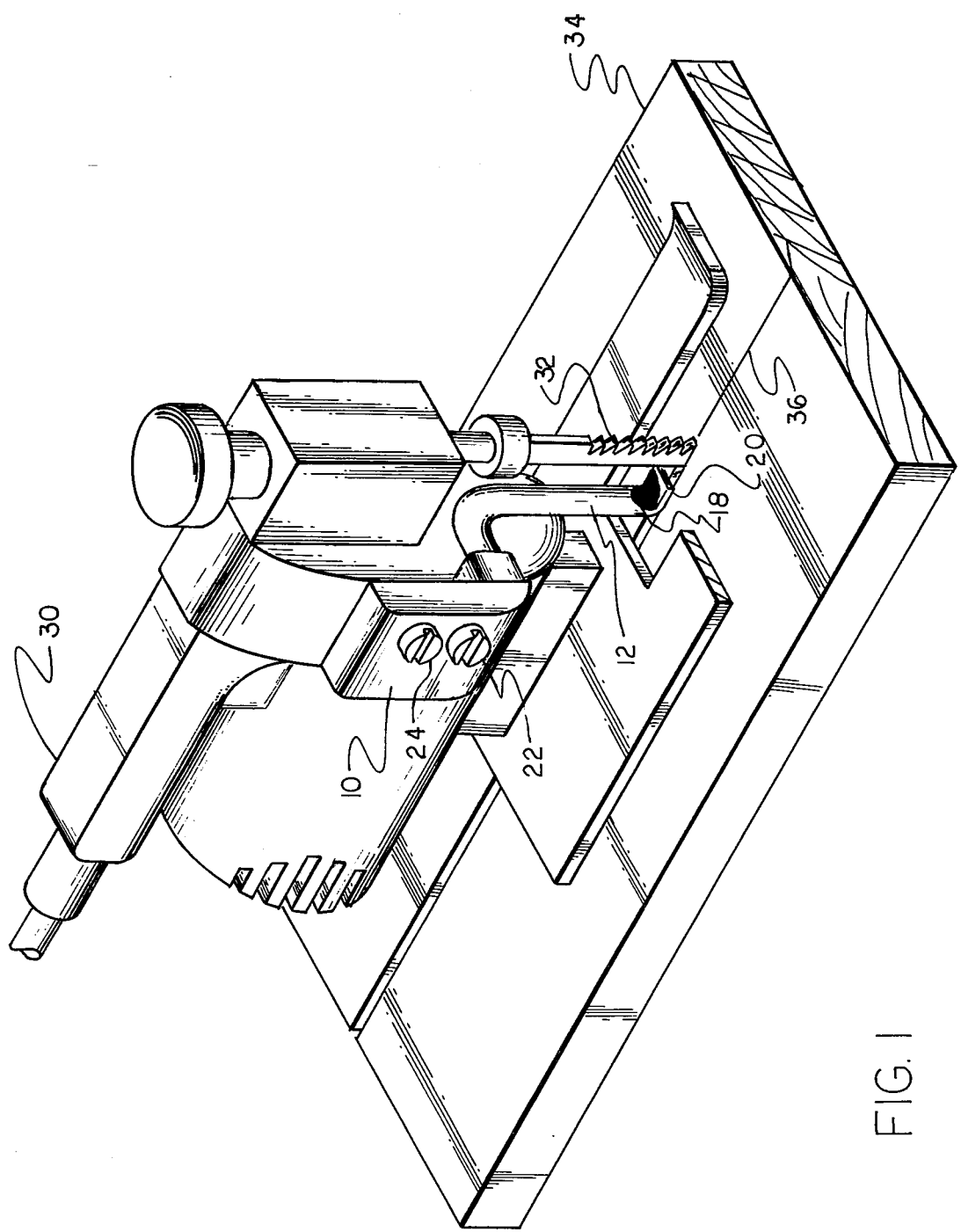
FIG. 1 is a perspective view of a saber saw having the sawdust removal device of the present invention attached to the exterior of the saw housing.

The preferred embodiment of the sawdust removal device of the present invention is illustrated in FIGS. 1-4. The sawdust removal device is comprised of two major components, namely, exhaust port cover 10 and air delivery tube 12.

In the preferred embodiment, exhaust port cover 10 is a solid body having an air trapping depression 14 which cooperates with an interior air passageway 16 to trap exhaust air discharged from one of the exhaust ports of a conventional saber saw and divert said air to air delivery tube 12. Air trapping depression 14 has an appropriate geometrical configuration for cooperation with the exhaust port to be covered. In FIGS. 2 and 4, air trapping depression 14 is shown as an elongated rectangular depression which gradually increases in depth from the upper end of the depression to the lower end of the depression. This particular geometrical configuration for air trapping depression 14 is suitable for exhaust port cover 10 when the sawdust removal device of the present invention is attached to the exterior of the housing of a saber saw having an elongated rectangular exhaust port. In FIGS. 2 and 4, interior air passageway 16 is shown as a cylindrical hole interconnecting air trapping depression 14 and air delivery tube 12.

In the preferred embodiment, air delivery tube 12 is a hollow tube having one end interconnected with the exit opening of interior air passageway 16. In FIGS. 1-4, this interconnection is shown as a force fit between one end of air delivery tube 12 and the exit opening of interior air passageway 16. Air nozzle 18 and air diffuser 20 are provided at the lower end of air delivery tube 12 to discharge and direct trapped and diverted exhaust air to continuously blow sawdust, chips and other debris from the surface of the wood or other material being cut by the saber saw.

Exhaust port cover 10 has been fabricated by machining the desired geometrical configuration from a solid block of plastic material. But, exhaust port cover 10 could be either machined or cast from an aluminum alloy or other suitable metal alloy. Also, it is possible to fabricate exhaust port 10 from a suitable plastic material by an injection molding process.

Air delivery tube 12 has been fabricated by cutting and bending copper tubing of the desired internal diameter to obtain the desired geometrical configuration. But, other types of tubing could be cut and bent to obtain the desired geometrical configuration for air delivery tube 12. Also, it is possible to fabricate air delivery tube 12 from a suitable plastic material by an injection molding process.

While inexpensive, lightweight structural materials are desirable for fabrication of the components of the sawdust removal device of the present invention, it is not intended that the present invention be limited in scope by the materials selected to fabricate the sawdust removal device. Furthermore, it is not intended that the present invention be limited in scope by the methods used to fabricate the sawdust removal device. In fact, it will be readily seen by those skilled in the manufacturing arts related to the fabrication of the sawdust removal device that the device could be fabricated as a single component rather than as two components in the manner described herein.

Traditional fastening means can be used to attach the sawdust removal device of the present invention to the exterior of the housing of a conventional saber saw. FIG. 1 illustrates the use of screw means 22 and 24 to attach the sawdust removal device to existing screw holes in the housing of a conventional saber saw. FIGS. 2, 3 and 4 illustrate the use of adhesive means 26 to attach the sawdust removal device to the housing of a conventional saber saw. Rivet means may be desirable if the sawdust removal device is attached during assembly of a new saber saw at the manufacturing facility.

The operation of the sawdust removal device of the present invention can best be understood by referring to FIG. 1 which shows the device attached to the exterior of the housing of saber saw 30. Saber saw 30 is equipped with a reciprocating saw blade 32. During operation of the saber saw, sawdust, chips and other debris are deposited on the upper surface of wooden board 34 after each upward stroke of reciprocating saw blade 32. But, the air which is continuously discharged from air nozzle 18 and distributed by diffuser 20 flows from its discharge point immediately behind reciprocating saw blade 32 and blows the sawdust, chips and other debris from that portion of the surface of wooden board 34 which is in the immediate vicinity of reciprocating saw blade 32. Accordingly, the user of saber saw 30 has a clear and unobstructed view of line 36 at all times during operation of saber saw 30.

While the present invention has been disclosed in connection with the preferred embodiment thereof, it should be understood that there may be other embodiments which fall within the spirit and scope of the invention as defined by the following claims:

I claim:

1. A sawdust removal device for attachment to the exterior housing of an electric-powered saw or drill, comprising:
    (a) an exhaust port cover having an air trapping depression for trapping and diverting air discharged from an exhaust port of the saw or drill and an interior air passageway having an entrance opening interconnected with said air trapping depression;
    (b) an air delivery tube interconnected at one end thereof with the exit opening of said interior air passageway in said exhaust port cover;
    (c) an air nozzle and a diffuser on the other end of said air delivery tube for discharging trapped and diverted air to continuously blow away sawdust, chips and other debris from the surface of the material being cut or drilled; and
    (d) means for attaching the device to the exterior housing of the electric-powered saw or drill.

2. A sawdust removal device as recited in claim 1, wherein said means for attaching the device are screw means.

3. A sawdust removal device as recited in claim 1, wherein said means for attaching the device are rivet means.

4. A sawdust removal device for attachment to the exterior housing of an electric-powered saw or drill, comprising:
    (a) an exhaust port cover having an air trapping depression for trapping and diverting air discharged from an exhaust port of the saw or drill and an interior air passageway having an entrance opening interconnected with said air trapping depression;
    (b) an air delivery tube interconnected at one end thereof with the exit opening of said interior air passageway in said exhaust port cover;
    (c) an air nozzle and a diffuser on the other end of said air delivery tube for discharging trapped and diverted air to continuously blow away sawdust, chips and other debris from the surface of the material being cut or drilled; and
    (d) adhesive means for attaching the device to the exterior housing of the electric-powered saw or drill.

5. A sawdust removal device for attachment to the exterior housing of an electric-powered saw or drill, comprising:
    (a) an exhaust port cover having an elongated rectangular depression which gradually increases in depth from the upper end of the depression to the lower end of the depression and thereby traps and diverts air discharged from an exhaust port of the saw or drill, and having an interior air passageway having an entrance opening interconnected with said air trapping depression;

(b) an air delivery tube interconnected at one end thereof with the exit opening of said interior air passageway in said exhaust port cover;

(c) an air nozzle and a diffuser on the other end of said air delivery tube for discharging trapped and diverted air to continuously blow away sawdust, chips and other debris from the surface of the material being cut or drilled; and (d) means for attaching the device to the exterior housing of the electric-powered saw or drill.

6. A sawdust removal device as recited in claim 5, wherein the entrance opening of said interior air passageway interconnects with said air trapping depression near the lower end of the depression.

7. A sawdust removal device as recited in claim 5 or 6, wherein said means for attaching the device are screw means.

8. A sawdust removal device as recited in claim 5 or 6, wherein said means for attaching the device are adhesive means.

9. A sawdust removal device as recited in claim 5 or 6, wherein said means for attaching the device are rivet means.

* * * * *